(12) United States Patent
Hoffman, Jr. et al.

(10) Patent No.: US 10,210,760 B2
(45) Date of Patent: Feb. 19, 2019

(54) SYSTEM AND METHOD FOR AUTONOMOUS PARKING OF A VEHICLE

(71) Applicant: Dura Operating, LLC, Auburn Hills, MI (US)

(72) Inventors: Robert John Hoffman, Jr., Royal Oak, MI (US); Cumhur Unveren, Commerce Township, MI (US); Sandeep Karjala, Troy, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 100 days.

(21) Appl. No.: 15/271,643

(22) Filed: Sep. 21, 2016

(65) Prior Publication Data

US 2018/0082588 A1   Mar. 22, 2018

(51) Int. Cl.
*G08G 1/16* (2006.01)
*G01S 5/12* (2006.01)
*G01S 11/06* (2006.01)
*G05D 1/00* (2006.01)
*B60W 30/06* (2006.01)

(52) U.S. Cl.
CPC ............... *G08G 1/166* (2013.01); *G01S 5/12* (2013.01); *G01S 11/06* (2013.01); *G05D 1/0088* (2013.01); *G08G 1/168* (2013.01); *B60W 30/06* (2013.01)

(58) Field of Classification Search
CPC ........ G08G 1/166; G08G 1/168; G01S 11/06; G01S 5/12; G05D 1/0088; B60W 30/06
See application file for complete search history.

(56) References Cited

U.S. PATENT DOCUMENTS

| | | | |
|---|---|---|---|
| 5,828,433 A | 10/1998 | Shin | |
| 7,844,377 B2 | 11/2010 | Oota et al. | |
| 8,868,254 B2 | 10/2014 | Louboutin | |
| 9,168,927 B2 | 10/2015 | Louboutin | |
| 9,194,168 B1 | 11/2015 | Lu et al. | |
| 9,261,881 B1 | 2/2016 | Ferguson et al. | |
| 9,896,091 B1 * | 2/2018 | Kurt | G08G 1/143 |
| 9,903,943 B2 * | 2/2018 | Lu | G01S 11/06 |

(Continued)

FOREIGN PATENT DOCUMENTS

| | | |
|---|---|---|
| DE | 102013019909 A1 | 5/2015 |
| EP | 2672739 A1 | 12/2013 |

*Primary Examiner* — Frederick M Brushaber
(74) *Attorney, Agent, or Firm* — Porter, Wright, Morris & Arthur, LLP; Robert E. Ford

(57) ABSTRACT

A method for autonomous parking of a vehicle includes requesting initiation of an autonomous parking routine; determining the location of a vehicle user of the vehicle comprising the steps of: (a) transmitting a signal by one of an electronic device in the immediate vicinity of the vehicle user and a vehicle transceiver; (b) receiving the signal by the other of the electronic device in the immediate vicinity of the vehicle user and the vehicle transceiver; (c) measuring the strength of the received signal; (d) determining a distance between the electronic device and transceiver based on the strength of the received signal; (e) correlating the distance between the electronic device and transceiver as the distance that the vehicle user is from the vehicle; and initiating the autonomous parking routine only if the vehicle user is determined to be within the vehicle or beyond a predetermined distance from the vehicle.

19 Claims, 4 Drawing Sheets

(56) References Cited

U.S. PATENT DOCUMENTS

| | | | |
|---|---|---|---|
| 2002/0025823 A1* | 2/2002 | Hara | B60R 25/24 |
| | | | 455/456.5 |
| 2014/0172221 A1* | 6/2014 | Solyom | B62D 15/0285 |
| | | | 701/23 |
| 2014/0358835 A1 | 12/2014 | Marti et al. | |
| 2015/0048927 A1 | 2/2015 | Simmons | |
| 2015/0084736 A1 | 3/2015 | Horton | |
| 2015/0105944 A1* | 4/2015 | Louboutin | H04W 4/021 |
| | | | 701/2 |
| 2015/0166062 A1* | 6/2015 | Johnson | B60W 30/12 |
| | | | 701/41 |
| 2016/0144857 A1* | 5/2016 | Ohshima | G05D 1/0061 |
| | | | 701/23 |
| 2016/0274213 A1* | 9/2016 | Fu | G01S 5/0221 |
| 2018/0050690 A1* | 2/2018 | Kurt | B60W 30/06 |
| 2018/0052460 A1* | 2/2018 | Kurt | G05D 1/0088 |
| 2018/0056989 A1* | 3/2018 | Donald | G05D 1/0246 |
| 2018/0088572 A1* | 3/2018 | Uchida | B60W 50/14 |

* cited by examiner

SYSTEM AND METHOD FOR AUTONOMOUS PARKING OF A VEHICLE

TECHNICAL FIELD

The invention relates to a system and method for the autonomous parking of a vehicle; more specifically, to a system and method of locating a user of the vehicle and pedestrians before initiating a parking routine for autonomously navigating the vehicle into a parking space.

BACKGROUND

The statements in this section merely provide background information related to the present disclosure and may or may not constitute prior art.

Autonomous vehicles are vehicles that have a high degree of automation that can transport passengers or items from one location to another. A typical autonomous vehicle uses a variety of sensors such as cameras, sonic sensors, radar, LiDAR, GPS receivers, and inertia measuring units to detect the vehicle's exterior surroundings and the vehicle status. An onboard controller determines an appropriate path based on a desired destination input by a user of the vehicle and uses the information gathered by the sensors to instruct the vehicle's drive control system to maneuver the vehicle to the desired destination.

SAE International Standard J3016, "Taxonomy and Definitions for Terms Related to On-Road Motor Vehicle Automated Driving Systems", issued January 2014, provides six (6) levels of automation, from SAE Level 0, No Automation, to SAE Level 5, Full Automation. For certain higher SAE levels of autonomous vehicles, the onboard controller may be programmed with a self-parking routine in which the onboard controller would analyze the surroundings, identify an available parking space, calculate a proper parking path, and control the driving systems of the vehicle to navigate the vehicle through the calculated parking path into the parking space. The autonomous parking routine may be initiated and executed by the controller upon receiving a request from the user of the vehicle. The request may be inputted to the onboard controller by pushing a real or virtual button on the dashboard, by voice command, and/or by sending an electronic signal from a portable electronic device by the vehicle user outside of the vehicle.

To ensure the safety of the vehicle user, there remains a need to determine the location of the vehicle user to confirm that the vehicle user is not within the calculated parking path of the vehicle before initiating the parking routine. There is also a need to determine the locations of pedestrians in the near or predefined vicinity of the vehicle before initiating the parking routine or aborting the routine if a pedestrian should cross the calculated parking path.

SUMMARY

A method for autonomous parking of a vehicle is provided. The method includes the steps of: requesting initiation of an autonomous parking routine; determining the location of a vehicle user of the vehicle comprising the steps of: (a) transmitting a signal by one of an electronic device in the immediate vicinity of the vehicle user and a vehicle transceiver, (b) receiving the signal by the other of the electronic device in the immediate vicinity of the vehicle user and the vehicle transceiver, (c) measuring the strength of the received signal; (d) determining a distance between the electronic device and transceiver based on the strength of the received signal, (e) correlating the distance between the electronic device and transceiver as the distance that the vehicle user is from the vehicle; and initiating the autonomous parking routine if the vehicle user is determined to be within the vehicle or beyond a predetermined distance from the vehicle.

In one aspect, the step of determining the location of the vehicle user of the vehicle further includes (i) determining the vehicle user to be within the vehicle if the strength of the received signal is above a predetermined value or (ii) determining the vehicle user to be outside the vehicle if the strength of the received signal is below the predetermined value.

In another aspect, the step of determining the location of the vehicle user of the vehicle further includes: measuring the strength of the signal if the vehicle user is determined to be outside the vehicle; and determining the distance the electronic device is away from the vehicle based on a predetermined relationship between the signal strength and the distance from vehicle. The predetermined relationship between the signal strength and the distance from vehicle is a lookup table correlating signal strengths with respective distances from the vehicle.

In another aspect, the method further includes the steps of (ii) activating a warning alert if the distance between the electronic device and the vehicle is at or less than the predetermined distance, or (iii) initiating the autonomous parking routine if the distance between the electronic device and the vehicle is greater than the predetermined distance.

In another aspect, the method further includes the steps of detecting a pedestrian in the vicinity of the vehicle; determining the distance between the pedestrian and the vehicle; and (iv) aborting the initiation of the autonomous parking routine and activating the warning alert if the pedestrian is detected within the predetermined distance from the vehicle, or (v) initiating the autonomous parking routine if the distance between the pedestrian and the vehicle is greater than the predetermined distance.

In another aspect, the step of detecting the pedestrian includes detecting the pedestrian with at least one vehicle sensor selected from a group of ranging sensors consisting of LiDAR, laser, sonar, and radar.

In another aspect, the electronic device includes a portable electronic device selected from a group consisting of a key fob, an electronic tablet, a cellular phone, a smart phone, a smart watch, a laptop, and a portable transceiver.

In another aspect, the onboard controller is paired with the portable electronic device and the step of determining the location of the vehicle user includes determining the direction of the electronic device relative to a side of the vehicle based on the distance of an antenna of a multi-antenna arrangement receiving the strongest signal from the electronic device.

A method of determining the location of a portable electronic device relative to an autonomous vehicle is also provided. The method includes the steps of: receiving a signal, by an antenna arrangement having a plurality of antennas mounted on the vehicle, transmitted by an electronic device paired with the vehicle; measuring the strength of the signal received by each of the plurality of antennas; determining the direction of the electronic device with respect to the autonomous vehicle based the locations of the antenna and the strength of the signal received by each antenna; comparing the direction of the electronic device with a calculated path of travel for the autonomous vehicle; and initiate movement of the autonomous vehicle along the calculated path of travel if the direction of the electronic device is not within the calculated path of travel of the autonomous vehicle.

In one aspect, the step of determining the distance of the electronic device from the vehicle is based on the strength of the signal. The electronic device is determined to be within the vehicle if the strength of the signal is above a predetermined value.

A system for locating a vehicle user in the vicinity of a vehicle is provided. The system includes an antenna arrangement adapted to receive a communication signal from a portable electronic device; a receiver in communication with the antenna arrangement; a plurality of ranging sensors adapted to detect pedestrians 360 degrees from the vehicle; and a controller communicatively coupled to the plurality of ranging sensors and receiver. The controller is configured to measure the strength of the signal and determined the distance of the portable electronic device from the vehicle based on the strength of the signal.

In one aspect, the antenna arrangement comprises a plurality of antennas and the controller is further configured to determine the direction of the portable electronic device from the vehicle based on the respective portion of signal strength received from each of the plurality of antennas.

In another aspect, the controller is further configured to initiate an autonomous parking routine if the portable electronic device is determined to be within the vehicle or beyond a predetermined distance exterior of the vehicle.

In another aspect, the controller is further configured to analyze information from the ranging sensors determine a distance and a direction the pedestrian is from the vehicle.

In another aspect, the controller is further configured to abort the autonomous parking routine and activate a vehicle alert system if the location of the portable electronic device or the pedestrian is determined to be within a predetermined distance and direction exterior of the vehicle.

In another aspect, the plurality of ranging sensors is selected from a group consisting of LiDAR, laser, sonar, and radar.

In another aspect, the portable electronic device is selected from a group consisting of a key fob, an electronic tablet, a cellular phone, a smart phone, a laptop, and a portable transceiver.

Further aspects, examples, and advantages will become apparent by reference to the following description and appended drawings wherein like reference numbers refer to the same or similar component, element, or feature.

BRIEF DESCRIPTION OF THE DRAWINGS

The above and other aspects will become more apparent and more readily appreciated from the following description of exemplary embodiments, taken in conjunction with the accompanying drawings in which.

DETAILED DESCRIPTION

The following description is merely exemplary in nature and is not intended to limit the present disclosure, applications, or uses.

Figure 1:
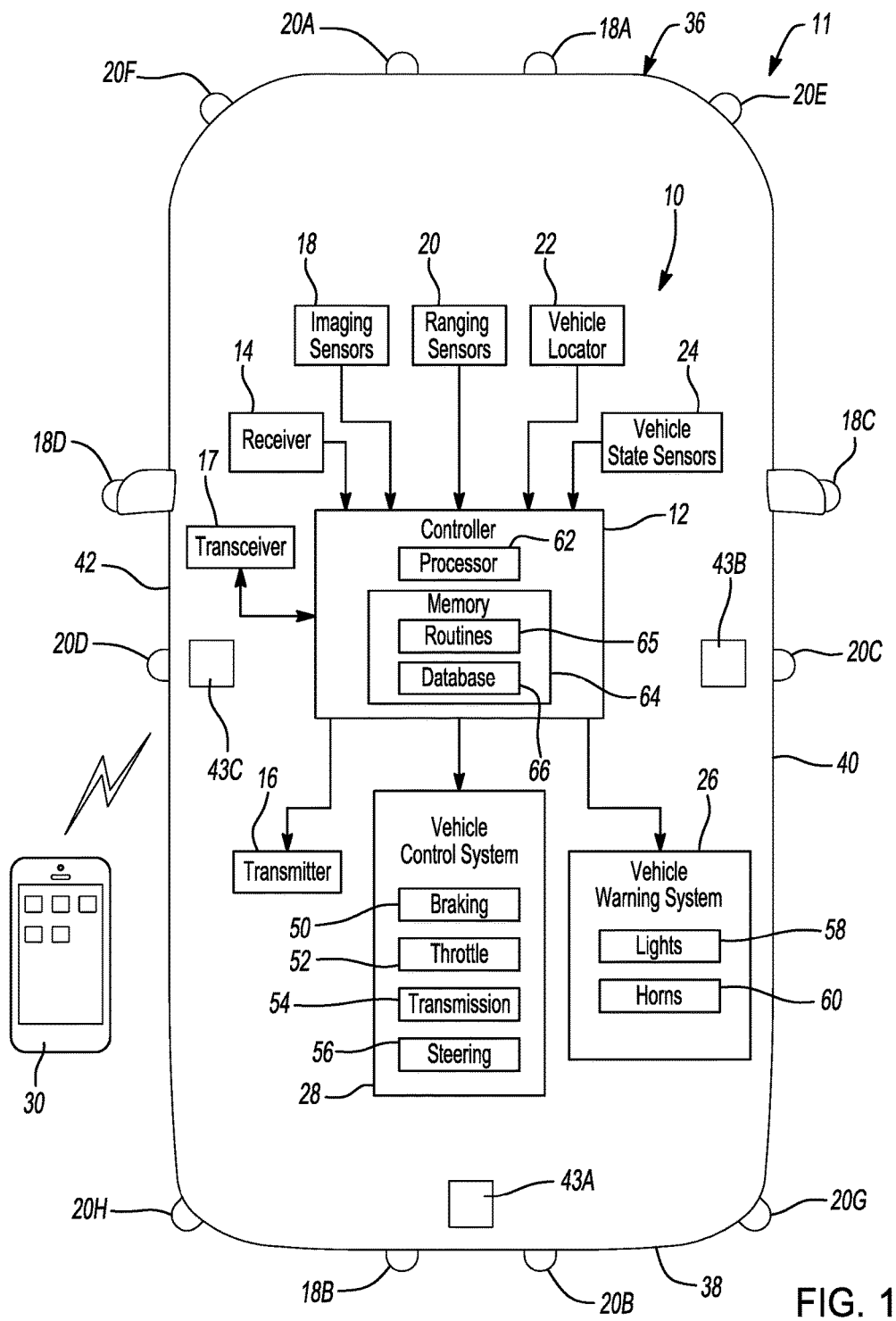
FIG. 1 is a block diagram of a system for the autonomous parking of a vehicle.

FIG. 1 shows a block diagram of an autonomous parking system 10 for the autonomous parking of a vehicle 11. The autonomous parking system 10 includes a controller 12 in communication with a receiver 14, a transmitter 16, a plurality of exterior sensors including imaging sensors 18 and ranging sensors 20, a vehicle locator 22, a plurality of vehicle state sensors 24, a vehicle warning system 26, and a vehicle control system 28. The system 10 is operable to communicate wirelessly with a portable electronic device 30 that is paired and authenticated with the controller 12.

The autonomous parking system 10 is operable to determine the location of an operator of the vehicle 11, also known as a vehicle user 32, before initiating an autonomous parking routine. The vehicle user 32 includes the driver, operator, and/or passenger who possess the portable electronic device 30. The autonomous parking system 10 communicates with the portable electronic device 30 to determine the distance and direction that the vehicle user 32 away from the vehicle 11. This is based on the premise that the portable electronic device 30 is within the immediate vicinity of the vehicle user 32. The immediate vicinity is defined as within arm's reach of the vehicle user 32, preferably on the person of the vehicle user 32. The autonomous parking system 10 is also operable to detect pedestrians 34 in a predefined proximal vicinity of the vehicle 11.

For illustrative purposes, a passenger type vehicle 11 is shown having the autonomous parking system 10. The vehicle 11 may be also that of a truck, sport utility vehicle, van, motor home, or any other type of vehicle without departing from the scope of the present disclosure. The vehicle 11 includes a front fascia 36, a rear fascia 38, a right side 40, and a left side 42. The vehicle 11 includes an antenna arrangement 43 having a plurality of antennas 43A, 43B, 43C, in electrical communication with the receiver 14 and transmitter 16. The antennas 43A, 43B, 43C may be mounted on the vehicle 11 in such a way to allow for the triangulation of an incoming communication signal from the portable electronic device 30 to determine the distance and direction of the source of the communication signal based on the proportional signal strength that each of the antennas 43A, 43B, 43C. By way of example only, the individual antennas 43A, 43B, 43C may be mounted adjacent the rear fascia 38, right side 40, and left side 42 of the vehicle 11, respectively.

The receiver 14 is configured to convert the communication signal received from the portable electronic device 30 into electrical signals for the controller 12 to determine the strength of the signal. The receiver 14 and transmitter 16 may be a single integral unit, such as a transceiver 17. The transceiver 17 may be that of the head unit in the in the infotainment stack (not shown) typically located within the dashboard of the passenger compartment of the vehicle 11. The transceiver 17 and portable electronic device 30 may be configured to communicate with each other using radio signals and/or nearfield communication protocols such as Bluetooth, WiFi, or ZigBee. RX and RSSI (Received Signal Strength Indication) techniques can be used to measure the signal strength. Both RX and RSSI are indications of the power level being received by an antenna 43A, 43B, 43C.

The plurality of imaging sensors 18 may include electronic cameras and/or Light Detection and Ranging (LiDAR) sensors mounted on the peripheral of the vehicle 11 to capture 360 degrees of overlapping coverage. By way of example only, the vehicle 11 may include a front mounted camera 18A, rear mounted camera 18B, a right side mounted camera 18C, and a left side mounted camera 18D. The cameras 18A, 18B, 18C, 18D are configured to capture visual information in the visible light spectrum and/or in a non-visual (e.g. infrared) portion of the light spectrum in the field of view of the respective camera. More specifically, each of the aforementioned cameras 18A, 18B, 18C, 18D is configured to capture light waves reflected from the markings imprinted or painted onto the surface of a road way, such as the lane markings or segment of lane markings that define a parking space, and images of moving objects, such as pedestrians 34.

A plurality of ranging sensors 20 are mounted on exterior peripheral of the vehicle 11. The ranging sensors 20 may include any ranging technology, including radar, laser, sonic sensors, LiDAR, etc., operable to detect moving objects proximal to the vehicle 11 and to determine the distance from each of the objects to the vehicle 11. The direction of each of the objects from the vehicle 11 may be determined based on the locations of the placement of the ranging sensors 20 on the vehicle 11. By way of example only, a front sonic sensor 20A is shown mounted on the front fascia 36, a rear sonic sensor 20B mounted on the rear fascia 38, a right sonic sensor 20C mounted on the right side 40, and a left sonic sensor 20D is mounted on the left side 42 of the vehicle 11. Additional ranging sensors 20 may be mounted on the vehicle 11 to obtain a more accurate direction of the detected object. For example, a front right sonic sensor 20E and a front left sonic sensor 20F are shown mounted on opposite ends of the front fascia 36. Similarly, rear right sonic sensor 20G and a rear left sonic sensor 20H are shown mounted on opposite ends of the rear fascia 38.

The vehicle locator 22 may be that of Global Positioning System (GPS) receiver. The GPS receiver receives multiple signals from multiple GPS satellites to determine the current location, speed, and direction of the vehicle 11. The GPS receiver may include an inertia sensor to estimate the speed and direction of the vehicle 11 during brief periods where there might be disruptions in receiving sufficient signals from the GPS satellites to determine the location of the vehicle 11.

The controller 12 takes the input data from the imaging sensors 18, ranging sensors 20, vehicle locator 22, and vehicle state sensors 24, processes the input data, and communicates with the vehicle control system 28 and vehicle warning system 26 for the autonomous operation of the vehicle 11. The vehicle state sensors 24 may include a speed sensor, a steering angle sensor, inertial measure unit (IMU), etc. communicatively coupled with the controller 12 to determine the state of the vehicle 11. The vehicle control system 28 includes any systems that implement the autonomous parking functions. For example, the vehicle control system 28 may include a braking control system 50, throttle control system 52, transmission control system 54, steering control system 56, etc. The vehicle warning system 26 operates visual and audible warnings, such as the vehicle lights 58 and horns 60, to alert pedestrians 34 in the calculated parking path of the vehicle 11 or within a predetermined distance of the vehicle 11.

The controller 12 includes a processor 62 and non-transitory computer readable memory 64. The processor 62 and memory 64 are shown as being within the same housing; however, it should be understood by those of ordinary skill in the art that the processor 62 and/or memory 64 may actually include multiple processors or memories that may or may not be stored within the same housing. For example, one or more processors may be a commercially available central processing unit (CPU) or an application-specific integrated circuit (ASIC) designed for a specific application. The controller 12 may employ analog and/or digital control circuitry including ASIC for processing the input data from the imaging sensors 18 and ranging sensors 20. It should be appreciated that the ASIC processor may be built into the circuitry of the each of the imaging sensors 18 and ranging sensors 20.

The non-transitory memory 64 stores a database 66 containing reference road markings as defined by the United States Department of Transportation for conveying messages to roadway users, including reference parking lane markings for delineating a parking space. The database 66 also contains reference images of types of parking space delineated by the parking lane markings, such as angled parking, parallel parking, and perpendicular parking spaces. The database 66 may also contain reference images of objects that are commonly found in a parking lot or parking structure, such as cones, barriers, and pedestrians 34.

The non-transitory computer readable memory 64 may contain multiple routines 65 that are executed by the processor 62 for the autonomous operation of the vehicle 11. One routine may include calculating a proper parking path based the type of parking space detected by the imaging sensors 18, or selected by a vehicle user 32. Another routine may include autonomously navigating the vehicle 11 through the calculated proper parking path into the parking space. Yet another routine may include determining the location of the vehicle user 32 and pedestrians 34 before initiating the parking routine to autonomously navigate the vehicle 11 through the calculated proper parking path.

The portable electronic device 30 may include a key fob, an electronic tablet, a cellular phone, a smart phone, a smart watch, a laptop, and/or a portable transceiver 17 that is paired and authenticated with the controller 12. The portable electronic device 30 is configured to receive a communication signal sent by the controller 12 via the vehicle transmitter 16 or transceiver 17.

Figure 2:
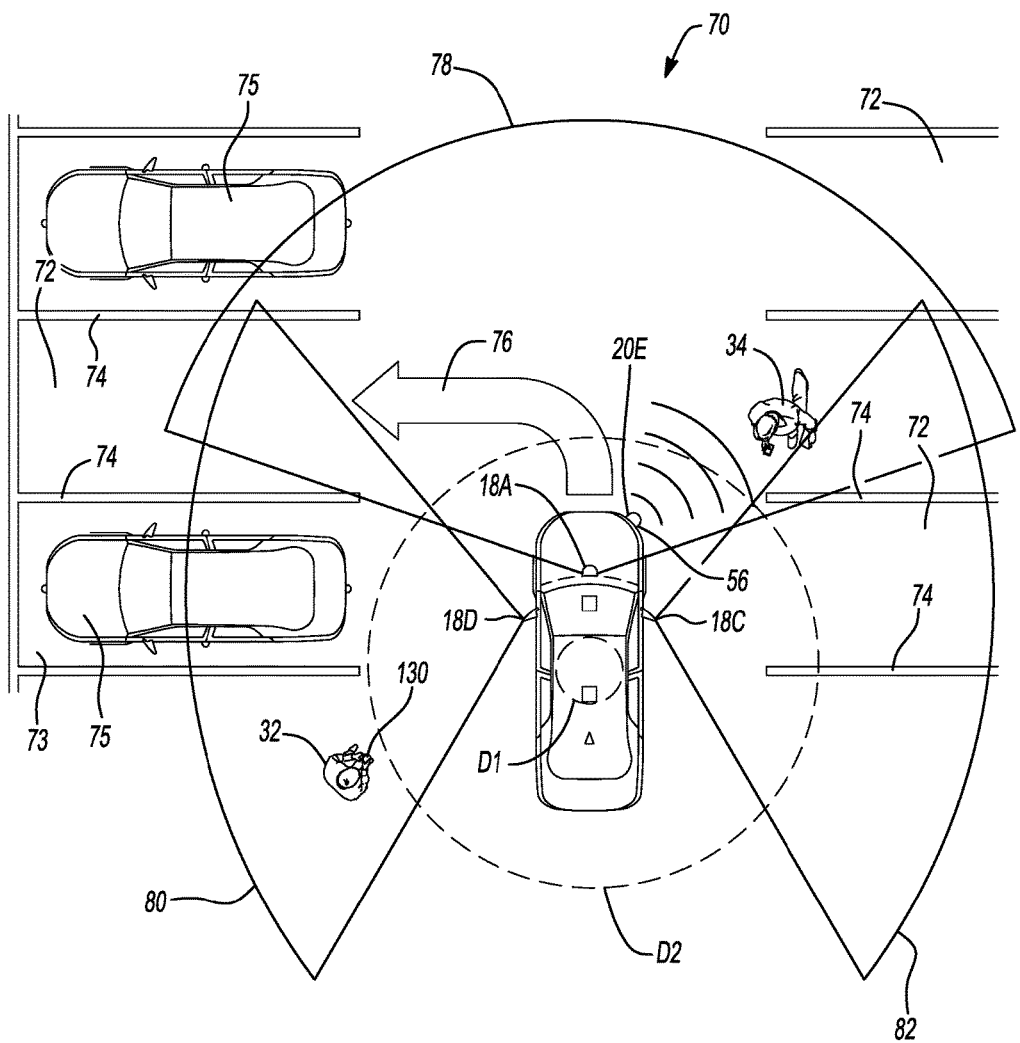
FIG. 2 is a top view illustration of an exemplary vehicle having the system of FIG. 1.

FIG. 2 shows the exemplary vehicle 11 equipped with the autonomous parking system 10 of FIG. 1 within a general parking lot 70 having a plurality of parking spaces 72. It should be appreciated that the parking lot 70 may have any configuration including that of a covered parking structure or open air parking area without departing from the scope of the present disclosure. The vehicle 11 is shown positioned proximal to an available parking space 72 delineated by parallel parking lines 74. Non-available parking spaces 73 are shown occupied by vehicles 75.

The autonomous parking system 10 determines the location of the vehicle user 32 and/or pedestrian 34 and initiates the autonomous parking routine if the vehicle user 32 and pedestrians 34 not within a predetermined area or zone proximal to the vehicle 11, defined by a calculated parking path 76 and/or predetermined distance (D2) from the vehicle 11. If the vehicle user 32 and/or pedestrian 34 is within the predetermine area, the system 10 activates the vehicle warning system 26 to alert the vehicle user 32 and/or pedestrian 34. The autonomous parking system 10 may abort the autonomous parking routine if the vehicle user 32 and/or pedestrian 34 enters the predetermined zone after the autonomous parking routine has been initiated.

Figure 3:
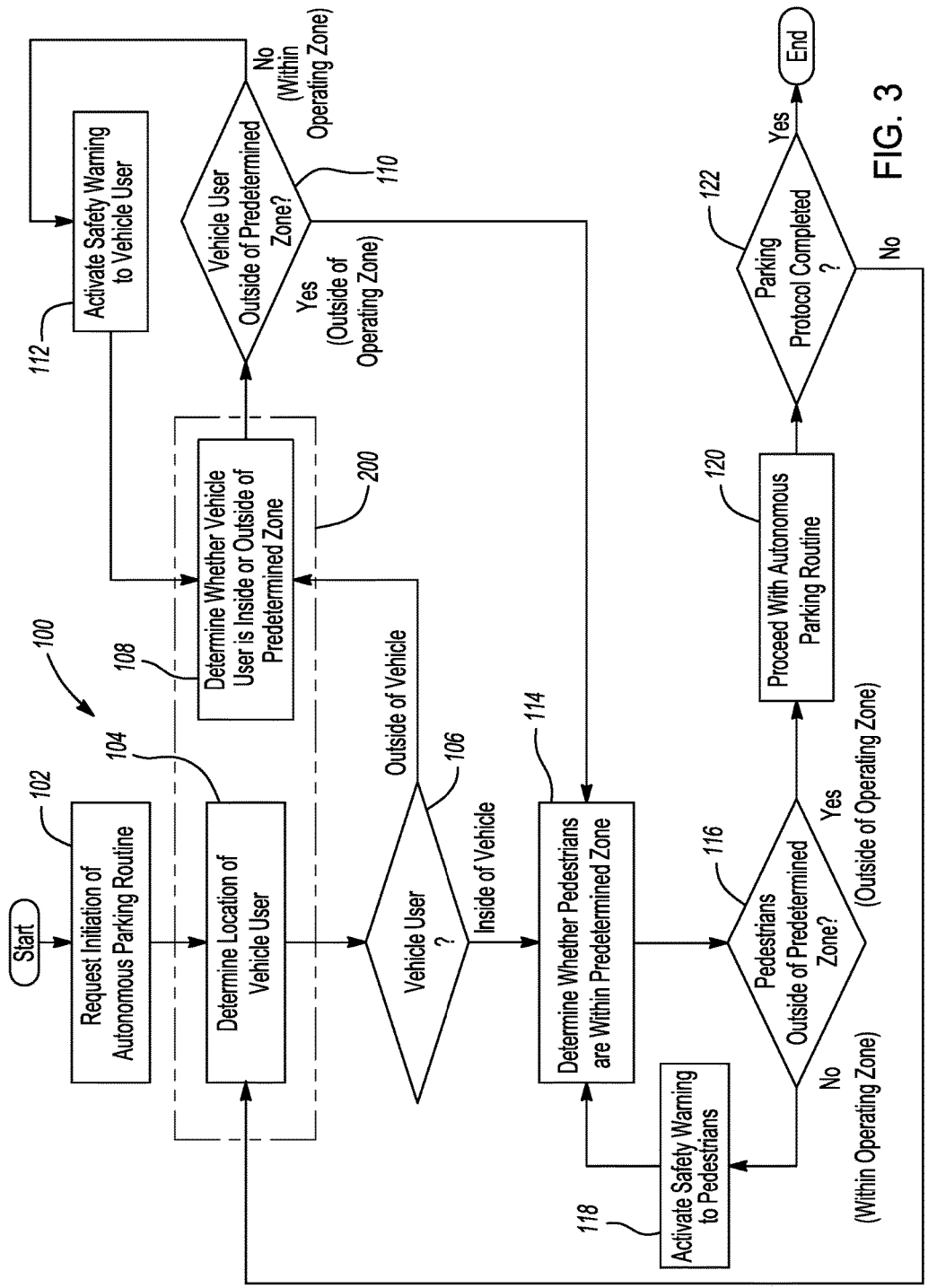
FIG. 3 is a flow diagram presenting a method of locating the user of the exemplary vehicle of FIG. 2 and pedestrians proximal to the vehicle.

FIG. 3 shows a flow diagram for a method 100 of autonomous parking of a vehicle 11, which, includes determining the location of the vehicle user 32 and pedestrian 34 in the proximity of the vehicle 11.

The method begins at step 102 when the vehicle user 32 positions the vehicle 11 proximal to an available parking space 72 and requests initiation of the autonomous parking routine. The controller 12 identifies the available parking space 72 and calculates a proper parking path 76 to navigate into the parking space 72. The processor 62 analyzes the images captured by the cameras 18A-D, detects features within the images, compares the detected features with reference features in the database 66, and identifies the features.

For example, referring to FIG. 2, the front camera 18A captures an image of the front field of view 78 and the left camera captures 18D an image of a left field of view 80. The processor 62 detects the lane markings 74 in the two images, compare the lane markings 74 with reference lane markings stored in the database 66, identifies the lane markings 74 as parking lanes, and fuses the images to generate a lane map of the parking space 72. Based on the lane map and location of the vehicle 11 relative to the mapped parking space 72, the processor 62 can execute a routine stored in the database 66 to calculate the proper parking path 76 for maneuvering the vehicle 11 into the parking space 72. Alternatively, for smaller size vehicles, LIDAR and/or a scanning laser may be used to detect the reflective paint of the lane markings 74, the processor 62 analyzes the particles detected by the LIDAR, and generates the lane map. An advantage of using LIDAR is that the distance to the lane markings 74 may also be determined.

At step 104, the location of the vehicle user 32 is determined by (a) transmitting a signal by the portable electronic device 30, (b) receiving the signal by the vehicle receiver 14, (c) measuring the strength of the received signal by the controller, (d) determining the distance that the electronic device 30 is away from the vehicle based on the strength of the received signal, and (e) correlating the distance of the electronic device 30 as the distance that the vehicle user 32 is from the vehicle 11. The controller 12 determines the distance that the portable electronic device 30 is away from the vehicle transmitter 16 based upon a predetermined relationship and/or lookup table between signal strength and distance.

Alternatively, the location of the vehicle user 32 is determined by (a) transmitting a signal by the vehicle transmitter 16, (b) receiving the signal by the portable electronic device 30, (c) measuring the strength of the received signal by the portable electronic device 30, (d) determining the distance that the electronic device 30 is away from the vehicle based on the strength of the received signal, and (e) correlating the distance of the electronic device 30 as the distance that the vehicle user 32 is from the vehicle 11. The portable electronic device 30 determines the distance that the portable electronic device 30 is away from the vehicle transmitter 16 based upon a predetermined relationship and/or lookup table between signal strength and distance.

It should be noted that if the transmitter of the signal is directly from the infotainment head unit located within the passenger compartment of the vehicle 11 (without utilizing the antenna arrangement 43), the strength of the signal received by the portable electronic device 30 may be greatly varied depending on whether the doors and/or windows of the vehicle 11 are closed. It is known that sheet metal and glass reduces the strength of the signal. For consistency, it is preferred that the doors, windows, moon roofs, and any other portals of the vehicle 11 are closed if the infotainment head unit is transmitting the signal without utilizing the antenna arrangement 43. It is preferable that the signal from the transmitter 16 is transmitted through the antenna arrangement 43.

At step 106, one of the controller 12 and portable electronic device determines whether the vehicle user 32 remains within the vehicle 11 or outside the vehicle 11 based on the strength of the received signal. The vehicle user 32 is determined to be (i) within the vehicle if the strength of the signal is above a predetermined value or (ii) outside the vehicle if the strength of the signal is below the predetermined value.

At step 108, if the controller 12 determines the location of the vehicle user 32 is outside of the vehicle 11 from step 106, the controller 12 continues to measure the strength of the signal transmitted by the electronic device 30. The distance the electronic device 30 (i.e. vehicle user 32) is away from the vehicle 11 based on a predetermined relationship between the signal strength and the distance from vehicle 11. The controller 12 may also fuse in the data received from the ranging sensors 20A-H to improve the accuracy of the distance. The controller 12 may also determine the direction of the electronic device 30 with respect to the autonomous vehicle 11 based the locations of the antennas 43A-C and the proportion of strength of the signal received by each antenna 43. The location of the vehicle user 32 may be determined once the distance and direction of the portable electronic device 30 is determined with respect to the vehicle 11.

At step 110, the controller 12 compares the location of the vehicle user 32, based on the distance and direction of the electronic device 30 away from the vehicle 11, the calculated path 76 of travel or the predetermined zone of caution defined by a predetermined distance (D2). The controller 12 may then initiate the autonomous parking routine to autonomously navigate the vehicle 11 through the calculated parking path 76 if the vehicle user 32 is determined to be (i) within the vehicle 11 (D1), (ii) outside the predetermined distance (D2) from the vehicle 11, or (iii) outside the calculated parking path 76 of the vehicle 11.

At step 112, if the vehicle user 32 is within the calculated path 76 of travel or predetermined zone of caution (D2), the controller 12 activates a component of the vehicle warning system 26 such as activating flashing lights 58 and/or sounding the horn 60 to warn the vehicle user 32. If the vehicle 11 was currently moving, the parking routine is immediate aborted until the vehicle user 32 has moved outside the calculated path 76 of travel and/or predetermined distance (D2).

At step 114, if the vehicle user 32 is determined to remain within the vehicle 11 (D1) from step 106 or if the vehicle user 32 is determined to be outside the path 76 of travel from step 110, the controller 12 takes data obtained from the imaging and ranging sensors 18, 20 to detect a pedestrian 34, if any, within the external vicinity of the vehicle 11. If the vehicle user 32 does not possess a portable electronic device 30 that is paired and authenticated with the controller 12, the vehicle user 32 is identified as a pedestrian 34 if the vehicle user 32 is detected exterior of the vehicle 11. Based on the locations of the imaging and ranging sensors 18, 20 the controller 12 determines the location of the pedestrian 34 with respect to the vehicle 11 by determining the distance between the pedestrian 34 and the vehicle 11, and the direction that the pedestrian 34 is away from the vehicle 11.

As an example, again referring to FIG. 2, the front camera 18A captures an image of the front field of view 78 and the right camera captures 18C an image of a right field of view 82. The processor 62 analyzes the images and detects an object, the processor 62 then compares the object with reference objects in the database 66, and identifies the object as being a pedestrian 34. Simultaneous, the front-right sonic sensor 20E detects the object to the front right of the vehicle 11 within the front field of view 78 and right field of view 82. The processor 62 fuses the information from the front and right view of views 78, 82 (i.e. pedestrian 34) with the information from the front-right sensor 20E (i.e. object within X distance from front right corner of vehicle 11), and identifies the object as a pedestrian 34 being a certain distance X from the front-right corner of the vehicle 11. In other words, the processor 62 is able to identify the object as being a pedestrian 34, together with the distance and direction of the pedestrian 34 from the vehicle 11. One the distance and direction of the pedestrian 34 are determined, the processor 62 can determine the location of the pedestrian 34 with respect to the vehicle 11.

At step 116, the controller 12 compares the location of the pedestrian 34, based on the distance and direction of the pedestrian 34 away from the vehicle 11, with the calculated path 76 of travel or predetermined zone (D2). The controller 12 proceeds to initiate the autonomous parking routine if the pedestrian 34 is determined to be (i) outside a predetermined zone (D2) from the vehicle 11 or (ii) outside the calculated parking path 76 of the vehicle 11.

At step 118, if the pedestrian 34 is detected within the calculated path 76 of travel or predetermined zone of caution (D2), the controller 12 activates a component of the vehicle warning system 26 such as activating flashing lights 58 and/or sounding the horn to warn 60 the pedestrian 34. If the vehicle 11 is maneuvering toward the parking space 72, the parking routine is immediate aborted until the pedestrian 34 has moved outside the calculated path 76 of travel.

At step 120, if there are no vehicle user 32 or pedestrian 34 detected in the path 76 of travel, the vehicle 11 continues to proceed with the parking routine by navigating the vehicle 11 into the parking spot.

At step 122, the controller 12 continues to track the location of the vehicle user 32 and pedestrian 34 by repeating the method until the vehicle 11 has completed the parking routine and the vehicle 11 is parked within the parking space 72.

Figure 4:
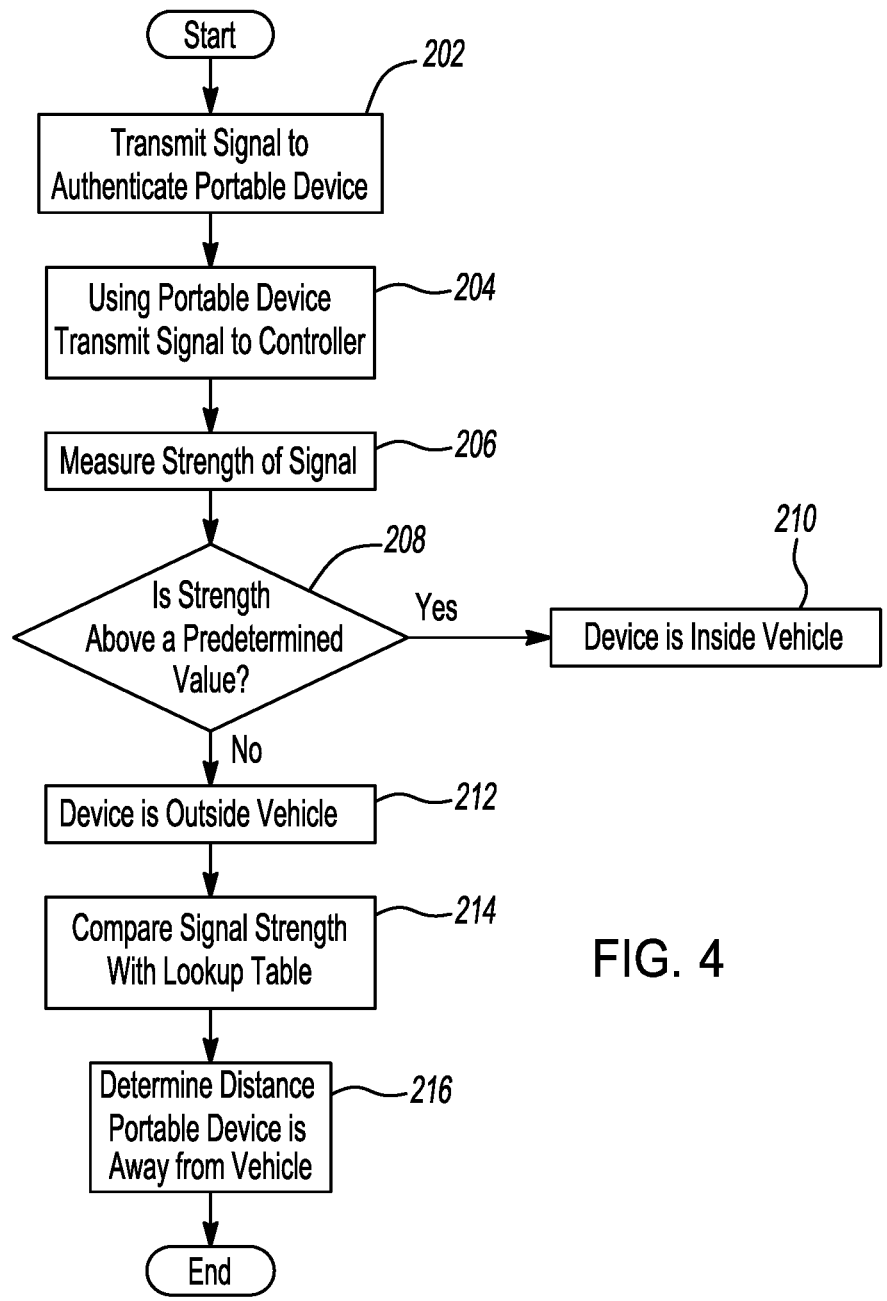
FIG. 4 is a flow diagram presenting a method of determining the location of a portable electronic device with respect to the location of the exemplary vehicle of FIG. 2.

FIG. 4 shows a flow diagram for a method 200 of determining the location of the portable electronic device 30 relative to the autonomous vehicle 11. The location of the portable electronic device 30 can be identified by determining the direction and distance that the electronic device 30 is away from the vehicle 11.

The method starts at step 202, the controller 12 communicates with the vehicle transmitter 16 to broadcast a communication signal identifying the vehicle 11. At step 204, the portable electronic device 30, paired and authenticated with the controller 12, receives the signal and transmits a response signal to the vehicle 11.

At step 206, the vehicle antenna arrangement 43 receives the response signal. The controller 12 determines the direction of the electronic device 30 with respect to the vehicle 11 based the locations of the antennas 43A-C and the proportion of strength of the signal received by each antenna 43A-C.

At step 208, the controller 12 determines the distance of the electronic device 30 from the vehicle 11 based on the strength of the signal received by the antenna arrangement 43. At step 210, the controller 12 determines the electronic device 30 to be within the vehicle 11 if the strength of the signal is above a predetermined value.

At step 212, the controller 12 determines the electronic device 30 to be outside the vehicle 11 if the strength of the signal is below a predetermined value. At step 214, if the electronic device 30 is determined to be outside the vehicle 11, then the controller 12 compares the received signal strength with a lookup table correlating signal strengths with respective distances from the vehicle 11. At step 216, the controller 12 determines the distance the portable device is away from the vehicle 11 based on the distance/signal strength correlation of the lookup table.

The description of the invention is merely exemplary in nature and variations that do not depart from the gist of the invention are intended to be within the scope of the invention. Such variations are not to be regarded as a departure from the spirit and scope of the invention. While some examples and embodiments for carrying out the claimed invention have been described in detail, various alternative designs and embodiments exist for practicing the invention defined in the appended claims.

We claim:

1. A method for autonomous parking of a vehicle, comprising the steps of:
   requesting initiation of an autonomous parking routine;
   determining a location of a vehicle user comprising the steps of:
   (a) transmitting a signal by one of an electronic device in the immediate vicinity of the vehicle user and a vehicle transceiver,
   (b) receiving the signal by the other of the electronic device in the immediate vicinity of the vehicle user and the vehicle transceiver,
   (c) measuring the strength of the received signal,
   (d) determining a distance between the electronic device and transceiver based on the strength of the received signal, and
   (e) correlating the distance between the electronic device and vehicle transceiver as the distance that the vehicle user is from the vehicle;
   initiating the autonomous parking routine to autonomously park the vehicle only if the vehicle user is determined to be one of within the vehicle or beyond a predetermined distance from the vehicle outside the vehicle; and
   initiating movement of the autonomous vehicle along a calculated path of travel if the vehicle user is not within the calculated path of travel of the autonomous vehicle.

2. The method of claim 1, wherein the step of determining the location of the vehicle user of the vehicle further includes one of (i) determining the vehicle user to be within the vehicle if the strength of the received signal is above a predetermined value or (ii) determining the vehicle user to be outside the vehicle if the strength of the received signal is below the predetermined value.

3. The method of claim 2, wherein the step of determining the location of the vehicle user of the vehicle further includes:
   measuring the strength of the received signal if the vehicle user is determined to be outside the vehicle; and
   determining the distance the electronic device is away from the vehicle based on a predetermined relationship between the signal strength and the distance from vehicle.

4. The method of claim 3, further comprising the steps of:
   (ii) activating a warning alert if the distance between the electronic device and the vehicle is at or less than the predetermined distance, or
   (iii) initiating the autonomous parking routine if the distance between the electronic device and the vehicle is greater than the predetermined distance.

5. The method of claim 4, further comprising the steps of:
   detecting a pedestrian in the vicinity of the vehicle outside the vehicle;
   determining the distance between the pedestrian and the vehicle; and one of (iv) aborting the initiation of the autonomous parking routine and activating the warning alert if the pedestrian is detected within the predetermined distance from the vehicle, or (v) initiating the autonomous parking routine if the distance between the pedestrian and the vehicle is greater than the predetermined distance.

6. The method of claim 5, wherein the step of detecting the pedestrian includes detecting the pedestrian with at least one vehicle sensor selected from a group of ranging sensors consisting of LiDAR, laser, sonar, and radar.

7. The method of claim 3, wherein the electronic device includes a portable electronic device selected from a group consisting of a key fob, an electronic tablet, a cellular phone, a smart phone, a smart watch, a laptop, and a portable transceiver.

8. The method of claim 7, further comprising the step of pairing an onboard controller with the portable electronic device.

9. The method of claim 3, wherein the predetermined relationship between the signal strength and the distance from vehicle is a lookup table correlating signal strengths with respective distances from the vehicle.

10. The method of claim 3, wherein the electronic device is transmitting the signal and the step of determining the location of the vehicle user further includes determining the direction of the electronic device relative to a side of the vehicle based on the distance of an antenna of a multi-antenna arrangement receiving the strongest signal from the electronic device.

11. A method of determining the location of a portable electronic device relative to an autonomous vehicle, comprising the steps of:

receiving a signal, by an antenna arrangement having a plurality of antennas mounted on the vehicle, transmitted by an electronic device paired with the vehicle;

measuring the strength of the signal received by each of the plurality of antennas;

determining the direction of the electronic device with respect to the autonomous vehicle based the locations of the antenna and the strength of the signal received by each antenna;

comparing the direction of the electronic device with a calculated path of travel for the autonomous vehicle; and initiate movement of the autonomous vehicle along the calculated path of travel if the direction of the electronic device is not within the calculated path of travel of the autonomous vehicle.

12. The method of claim 11 further including the step of determining the distance of the electronic device from the vehicle based on the strength of the signal.

13. The method of claim 11, further including the step of determining the electronic device to be within the vehicle if the strength of the signal is above a predetermined value.

14. A system for locating a vehicle user in the vicinity of a vehicle, the system comprising:

an antenna arrangement adapted to receive a communication signal from a portable electronic device;

a receiver in communication with the antenna arrangement;

a plurality of ranging sensors adapted to detect pedestrians 360 degrees from the vehicle;

a controller communicatively coupled to the plurality of ranging sensors and receiver;

wherein the controller is configured to measure the strength of the signal and determined the distance of the portable electronic device from the vehicle based on the strength of the signal;

wherein the controller is further configured to initiate an autonomous parking routine to autonomously park the vehicle only if the portable electronic device is determined to be one of within the vehicle or beyond a predetermined distance from the vehicle outside the vehicle; and wherein the controller is further configured to initiate movement of the autonomous vehicle along a calculated path of travel if the electronic device is not within the calculated path of travel of the autonomous vehicle.

15. The system of claim 14, wherein the antenna arrangement comprises a plurality of antennas; and wherein the controller is further configured to determine the direction of the portable electronic device from the vehicle based on the respective portion of signal strength received from each of the plurality of antennas.

16. The system of claim 15, wherein the controller is further configured to analyze information from the ranging sensors determine a distance and a direction the pedestrian is from the vehicle.

17. The system of claim 16, wherein the controller is further configured to abort the autonomous parking routine and activate a vehicle alert system if the location of at least one of the portable electronic device and the pedestrian is determined to be within a predetermined distance and direction exterior of the vehicle.

18. The system of claim 16 wherein the plurality of ranging sensors is selected from a group consisting of LiDAR, laser, sonar, and radar.

19. The system of claim 16 wherein the portable electronic device is selected from a group consisting of a key fob, an electronic tablet, a cellular phone, a smart phone, a laptop, and a portable transceiver.

* * * * *